US010221787B2

(12) United States Patent
Banker et al.

(10) Patent No.: US 10,221,787 B2
(45) Date of Patent: Mar. 5, 2019

(54) METHOD AND SYSTEM FOR A VARIABLE DISPLACEMENT ENGINE

(71) Applicant: Ford Global Technologies, LLC, Dearborn, MI (US)

(72) Inventors: Adam Nathan Banker, Canton, MI (US); Amey Y. Karnik, Canton, MI (US); Suzanne Kay Wait, Royal Oak, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/625,504

(22) Filed: Jun. 16, 2017

(65) Prior Publication Data

US 2018/0363566 A1    Dec. 20, 2018

(51) Int. Cl.

| F02D 11/02 | (2006.01) |
| F02D 41/00 | (2006.01) |
| F02M 35/10 | (2006.01) |
| F02D 13/06 | (2006.01) |
| F02D 17/02 | (2006.01) |

(52) U.S. Cl.
CPC .......... *F02D 41/0087* (2013.01); *F02D 11/02* (2013.01); *F02D 13/06* (2013.01); *F02D 17/02* (2013.01); *F02M 35/10386* (2013.01); *F02D 2041/0012* (2013.01); *F02D 2200/0402* (2013.01); *F02D 2200/0406* (2013.01)

(58) Field of Classification Search
CPC .......... F02D 13/06; F02D 17/00; F02D 17/02; F02D 17/023; F02D 17/04; F02D 2041/0012
See application file for complete search history.

(56) References Cited

U.S. PATENT DOCUMENTS

| 5,270,935 | A | 12/1993 | Dudek et al. | |
| 6,655,201 | B2 | 12/2003 | Masson et al. | |
| 6,705,286 | B1 | 3/2004 | Light et al. | |
| 7,027,905 | B1 | 4/2006 | Mladenovic et al. | |
| 7,469,672 | B2 * | 12/2008 | Andri .................... | B60K 6/445 123/198 F |
| 7,487,852 | B2 * | 2/2009 | Leone .................... | B60K 6/365 180/65.28 |
| 7,497,198 | B2 * | 3/2009 | Leone .................... | B60K 6/365 123/295 |
| 7,694,760 | B2 * | 4/2010 | Leone .................... | B60K 6/445 180/65.21 |
| 7,785,230 | B2 * | 8/2010 | Gibson ................. | B60W 30/20 477/101 |
| 9,835,082 | B2 * | 12/2017 | Vanderwege ....... | F02D 41/0087 |

(Continued)

*Primary Examiner* — Sizo Vilakazi
*Assistant Examiner* — Kevin R Steckbauer
(74) *Attorney, Agent, or Firm* — Julia Voutyras; McCoy Russell LLP

(57) ABSTRACT

Methods and systems are provided for monitoring torque delivery in a variable displacement engine using air flow metered via a throttle body model. During conditions when air flow estimation can be inaccurate, such as at wide open throttle, an induction ratio applied to the engine is constrained to 1.0, even if the operator torque demand is low. VDE degradation is inferred based on the commanded induction ratio relative to an actual induction ratio estimated based on the torque delivery.

19 Claims, 6 Drawing Sheets

(56) References Cited

U.S. PATENT DOCUMENTS

| | | | |
|---|---|---|---|
| 2007/0204830 A1* | 9/2007 | Andri | B60K 6/445 |
| | | | 123/198 F |
| 2007/0204838 A1* | 9/2007 | Leone | B60K 6/365 |
| | | | 123/518 |
| 2007/0205028 A1* | 9/2007 | Leone | B60K 6/445 |
| | | | 180/65.28 |
| 2007/0205029 A1* | 9/2007 | Leone | B60K 6/365 |
| | | | 180/65.225 |
| 2008/0287253 A1* | 11/2008 | Gibson | B60W 30/20 |
| | | | 477/53 |
| 2016/0108798 A1* | 4/2016 | VanDerWege | F02D 41/0087 |
| | | | 60/602 |
| 2016/0252023 A1* | 9/2016 | Srinivasan | F02D 41/2422 |
| | | | 701/115 |
| 2018/0003102 A1* | 1/2018 | VanDerWege | F02D 41/0087 |

\* cited by examiner

METHOD AND SYSTEM FOR A VARIABLE DISPLACEMENT ENGINE

FIELD

The present description relates generally to methods and systems for torque monitoring for a variable displacement engine.

BACKGROUND/SUMMARY

Engines may be configured to operate with a variable number of active or deactivated cylinders to increase fuel economy, while optionally maintaining the overall exhaust mixture air-fuel ratio about stoichiometry. Such engines are known as variable displacement engines (VDE). Therein, a portion of an engine's cylinders may be disabled during selected conditions defined by parameters such as an engine speed/load window, as well as various other operating conditions including operator torque demand. Conventional VDE control systems may disable a selected group of cylinders, such as a bank of cylinders, through the control of a plurality of cylinder valve deactivators that affect the operation of the cylinder's intake and exhaust valves, or through the control of a plurality of selectively deactivatable fuel injectors that affect cylinder fueling. Newer skip-fire or rolling VDE systems may be configured to activate/deactivate individual cylinders on an ongoing basis to provide a specific firing pattern based on a designated control algorithm.

VDE systems may utilize various methods of torque monitoring for ensuring proper torque delivery and diagnosing potential degradation of the VDE system. Example attempts to address torque monitoring include comparing two independent sources of torque estimates with the torque requested by an operator. One example approach is shown by Light et al. in U.S. Pat. No. 6,705,286. Therein, a torque monitoring algorithm compares driver torque demand to two independent torque estimates, one of which is estimated from throttle position, and the other estimated from mass airflow (MAF) to the intake manifold. If one of the two actual torque estimates exceeds the driver-demanded torque, the monitoring algorithm logic intervenes in engine torque production and sets a diagnostic code. Still other approaches of torque monitoring include fuel-injection based methods, where valve degradation may be assessed based on the duration of a spark event.

However, the inventors herein have recognized potential issues with such systems. As one example, fuel injection-based torque monitoring may not be suitable for use with rolling VDE systems because the number of active cylinders may often be overestimated, and packaging constraints may limit the feasibility of including fuel injector sensing for all cylinders individually. As another example, MAP based approaches for torque estimation rely on a comparison of air flow metering, as determined via a MAF sensor output to the dynamic effect of inducting cylinders, as determined via a change in MAP. However, reliance on MAF sensors for air flow metering and MAP sensors for manifold pressure change adds cost and complexity to the vehicle system. In addition, the sensors may themselves be prone to degradation. Still other approaches for air flow metering may model air flow across a throttle body at selected engine operating conditions. However, such models may be inaccurate at or near wide open throttle (WOT) conditions. As a result of the inaccuracies, the actual torque provided by the VDE system may exceed the driver demanded torque, resulting in a loss of fuel economy as well as drivability issues that are objectionable to the driver. For example, the vehicle may appear "jumpy". The inaccuracies in air flow estimation can also lead to an actual induction ratio being incorrectly estimated and a VDE mechanism being incorrectly indicated as degraded. If the VDE mechanism is disabled responsive to the indication, engine run time in the VDE mode is unnecessarily reduced, causing a loss of fuel economy.

The inventors herein have recognized that during conditions when the engine is operating at or near wide open throttle (WOT), torque inaccuracies may be reduced by constraining the induction ratio. For example, the VDE system may be limited to operating at an induction ratio of 1 to reduce over-torque issues. The resultant temporary drop in fuel economy may be acceptable to a vehicle driver in view of the improvement in vehicle drivability. Thus, in one example, the above issues may be at least partially addressed by a method comprising operating a variable displacement engine with an induction ratio based on operator torque demand; and responsive to throttle position being within a threshold distance of wide open throttle, independent of the operator torque demand, increasing the induction ratio. In this way, a more accurate torque estimation may be used to more reliably infer the actual induction ratio of a VDE system.

In one example, a variable displacement engine may be operated with one or more engine cylinders selectively deactivated responsive to operator torque demand. For example, at higher engine speeds and loads, the engine may be operated at a higher induction ratio with fewer cylinders deactivated, while at lower engine speeds and loads, the engine may be operated at a lower induction ratio with more cylinders deactivated. If the desired induction ratio is within a threshold of 1.0, the induction ratio applied may be constrained to 1.0 while overriding the desired induction ratio. In addition, during engine operating conditions where the desired induction ratio is outside the threshold of 1.0, but the intake throttle is at or within a threshold distance of WOT, the induction ratio applied may be increased towards 1.0 (e.g., step-wise increased towards 1.0 by incrementally moving to a next highest possible induction ratio) while overriding the desired induction ratio. By constraining the applied induction ratio during conditions when air flow metering may be inaccurate, torque inaccuracies may be reduced. During other conditions, an actual induction ratio may be inferred via a throttle body model used to infer air flow and a rate of change in manifold pressure across the throttle. If the actual induction ratio significantly differs from the commanded induction ratio, degradation of the VDE system may be inferred, and mitigating actions may be taken.

In this way, by relying on a throttle body model for metering air flow, the reliance on a MAF sensor is reduced, without compromising the accuracy of torque estimation or identification of potential VDE degradation. The technical effect of selectively constraining the induction ratio applied during operating conditions where air flow estimation and torque estimation may be inaccurate, the likelihood of over-delivering torque is reduced. By increasing the reliability of actual induction ratio estimation, the likelihood of incorrectly diagnosing VDE degradation and prematurely disabling VDE operation is reduced. By enabling VDE operation over a larger duration of engine operation, fuel economy and engine performance benefits of VDE may be extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
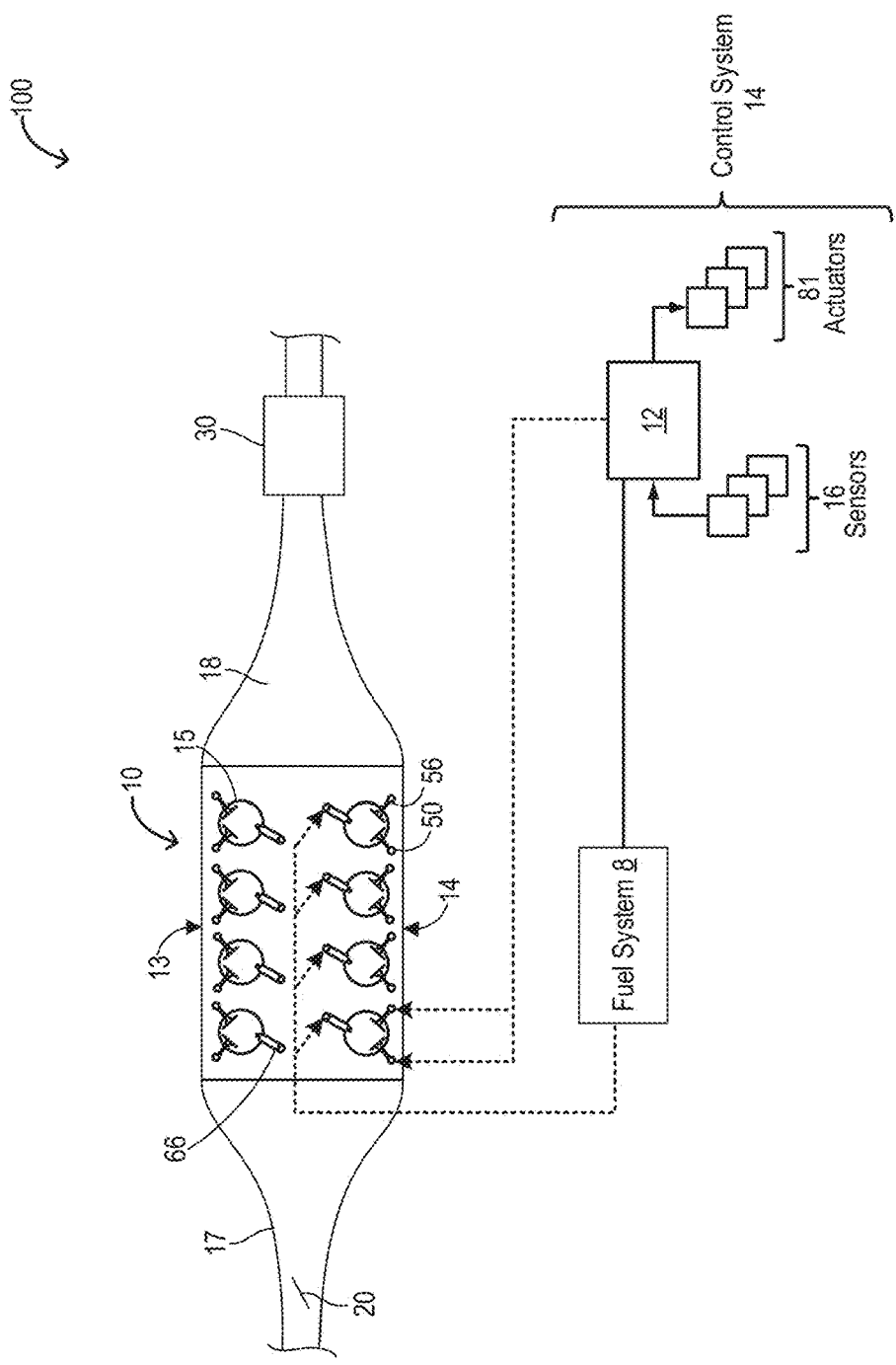
FIG. 1 shows an example embodiment of an engine system layout.
Figure 2:
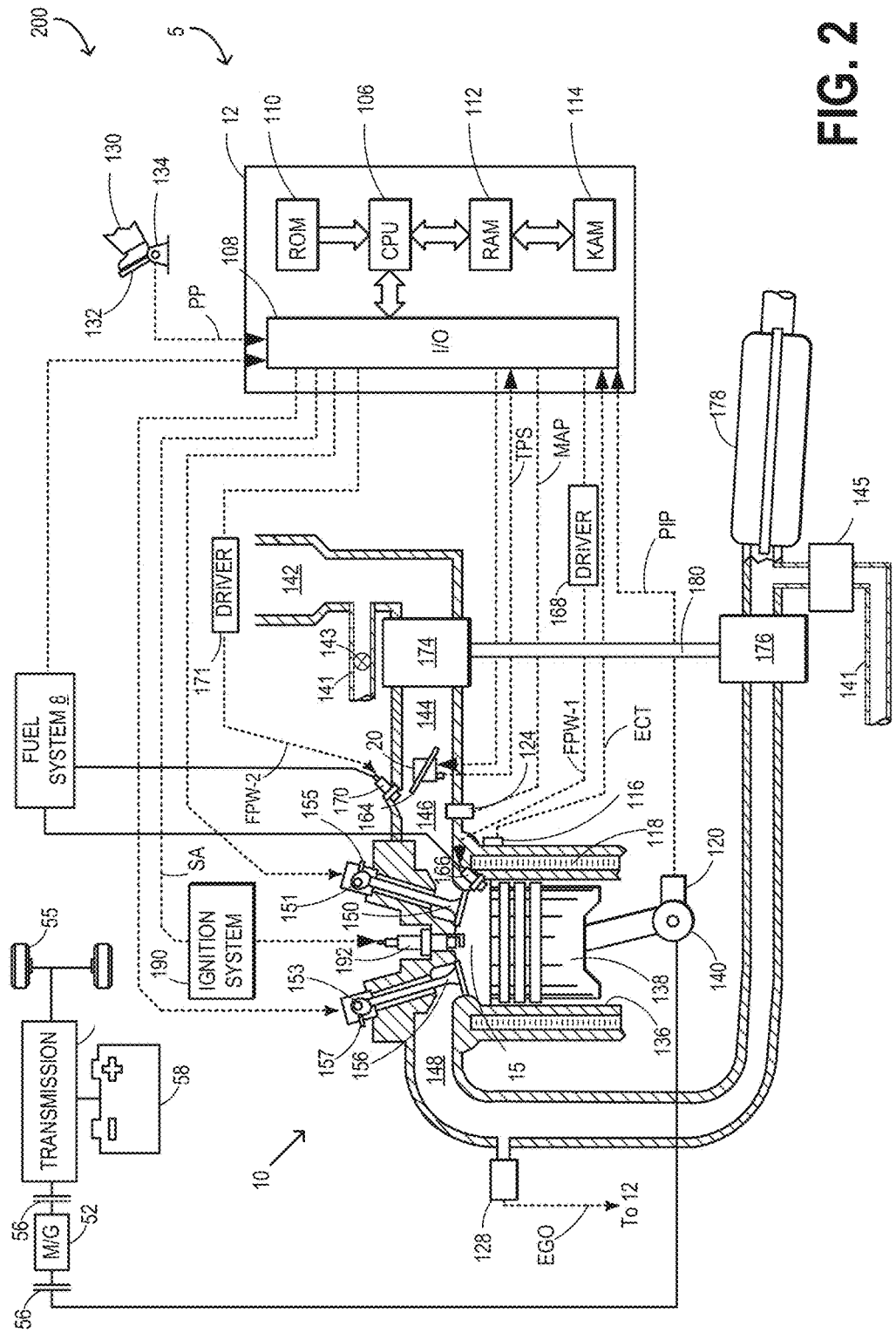
FIG. 2 shows a partial engine view.
Figure 5:
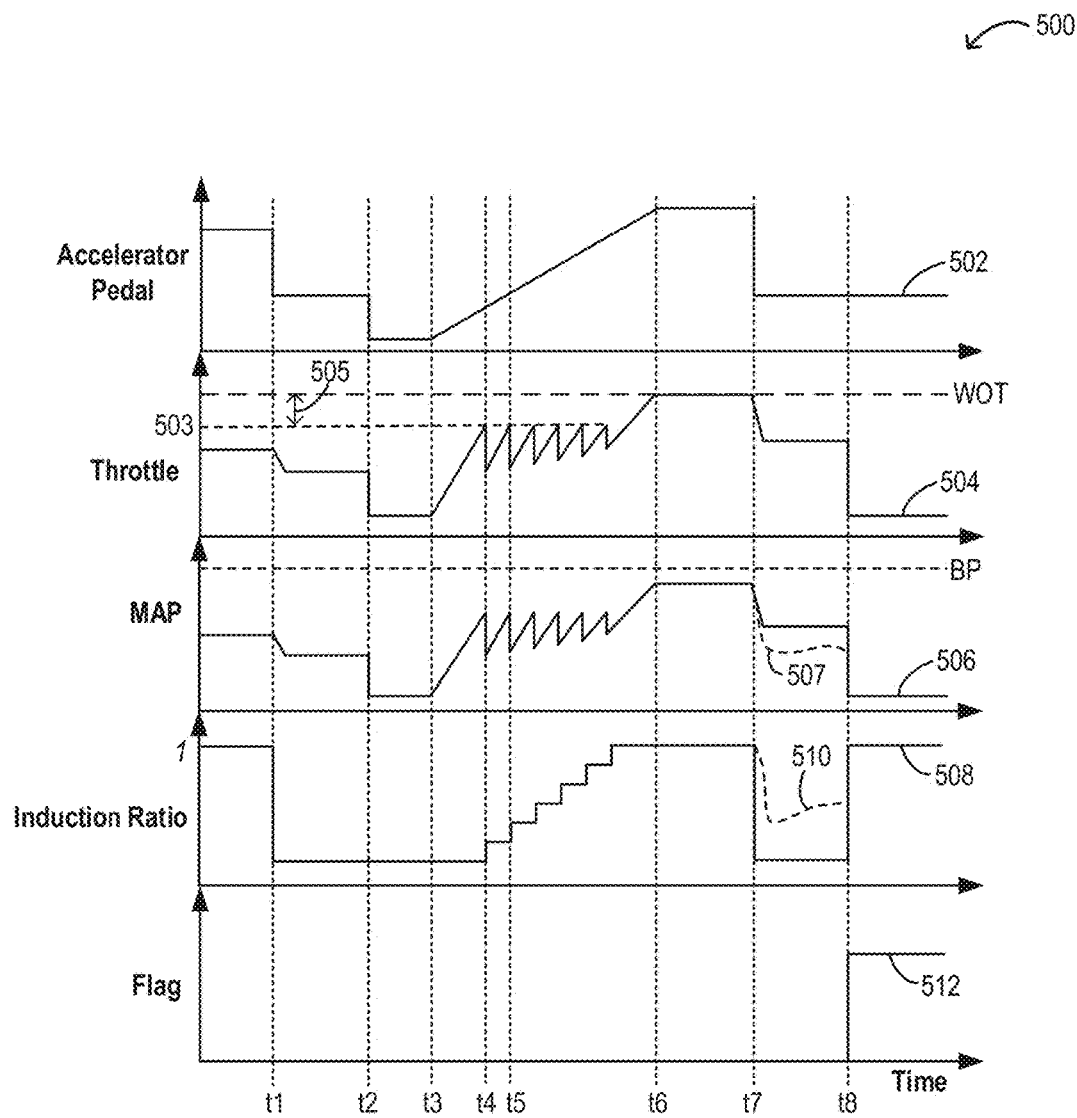
FIG. 5 shows a prophetic operation of an engine including controlling the induction ratio responsive to a throttle position, according to the present disclosure.
Figure 6:
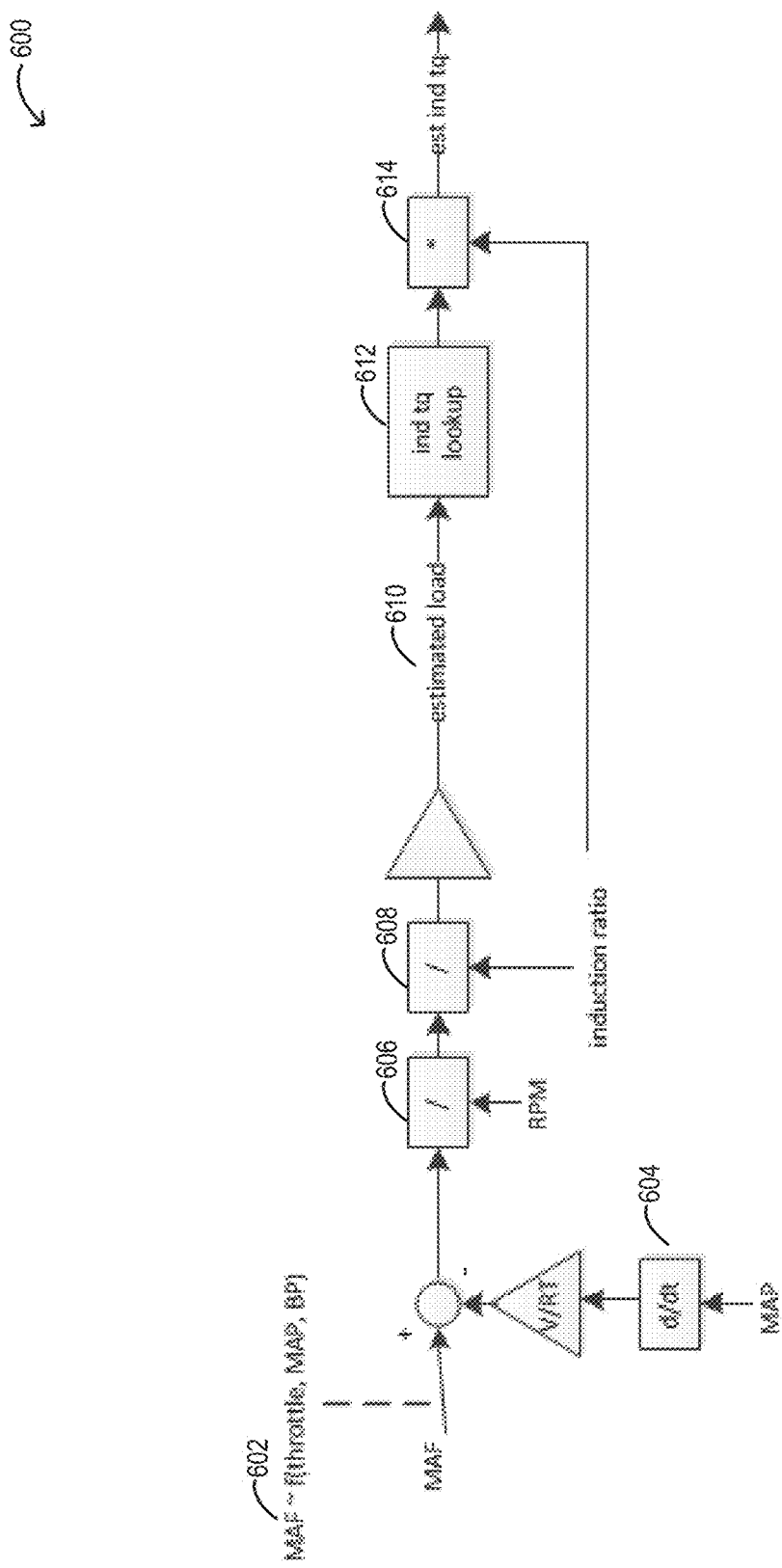
FIG. 6 shows an example block diagram of a torque monitoring method according to the present disclosure.

The following description relates to systems and methods for torque monitoring for an engine configured for selected, individual cylinder deactivation (herein also referred to as rolling VDE), such as for the engine system of FIGS. 1-2. By utilizing a throttle body model to estimate actual airflow in addition to data from an existing MAP sensor, independent torque estimates may be determined and compared, as shown at FIG. 6. An engine controller may be configured to perform a control routine, such as the example routine of FIG. 3, to coordinate throttle and induction ratio adjustments so as to maintain throttle position at a margin from wide-open throttle. The controller may be further configured to perform a diagnostic routine, such as the example routine of FIG. 4, to identify degradation of the VDE mechanism when an estimated actual induction ratio, estimated based on the independent torque estimates, deviates significantly from a desired induction ratio, estimated based on operator torque demand. Additionally, the controller may limit the applied induction ratio during conditions when air flow estimation may be prone to inaccuracies, such as when the throttle position nears wide-open-throttle (WOT). An example engine operation with VDE diagnostics is shown in FIG. 5.

Turning now to FIG. 1, an example engine system 100 is shown. Engine system 100 includes an engine 10 having a first cylinder bank 13 and a second cylinder bank 14. In the depicted example, engine 10 is a V-8 engine with two cylinder banks, each having four cylinders 15. However in alternate examples, the engine may have an alternate configuration, such as an alternate number of cylinders (e.g., V-4, V-6, etc.), or an in-line arrangement of cylinders (e.g., I-3, I-4, etc.). Engine 10 has an intake manifold 17, with intake throttle 20, and an exhaust manifold 18 coupled to an emission control system 30. Emission control system 30 includes one or more catalysts and air-fuel ratio sensors, such as described with regard to FIG. 2. Engine 10 may operate on a plurality of substances, which may be delivered via fuel system 8. As one non-limiting example, engine 10 can be included as part of a propulsion system for a passenger vehicle.

Engine 10 may be a variable displacement engine (VDE), having one or more cylinders 15 with selectively deactivatable intake valves 50 and selectively deactivatable exhaust valves 56. Therein, selected cylinders may be deactivated by shutting off the respective cylinder valves, as elaborated below. In one example, intake valves 50 and exhaust valves 56 are configured for electric valve actuation (EVA) via electric individual cylinder valve actuators. While the depicted example shows each cylinder having a single intake valve and a single exhaust valve, in alternate examples, as elaborated at FIG. 2, each cylinder may have a plurality of selectively deactivatable intake valves and/or a plurality of selectively deactivatable exhaust valves.

In some examples, engine 10 may have additionally have selectively deactivatable (direct) fuel injectors 66 and the selected cylinders may be deactivated by shutting off the respective fuel injectors while maintaining operation of the intake and exhaust valves such that air may continue to be pumped through the cylinders.

During selected conditions, such as when the full torque capability of the engine is not needed, one or more cylinders of engine 10 may be selected for selective deactivation (herein also referred to as individual cylinder deactivation). This may include selectively deactivating one or more cylinders on the first cylinder bank 13, and/or selectively deactivating one or more cylinders on the second cylinder bank 14. The number and identity of cylinders deactivated on the cylinder bank may be symmetrical or asymmetrical. An engine controller 12 may continually analyze individual cylinders, determining whether to activate or deactivate each cylinder based on a driver's pedal position input and torque demands, providing what us known as a skip-fire or rolling VDE mode of operation. In still other examples, entire banks or subsets of cylinders may be deactivated.

During the deactivation, selected cylinders may be deactivated by closing individual cylinder valve mechanisms (e.g., VDE mechanisms), such as intake valve mechanisms, exhaust valve mechanisms, or a combination of both. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. In addition, fuel flow to the deactivated cylinders may be stopped, such as by deactivating cylinder fuel injectors 66. In some examples, spark to the deactivated cylinders may also be stopped, such as by selectively controlling the vehicle ignition system to only deliver spark to active cylinders.

While the selected cylinders are disabled, the remaining enabled or active cylinders continue to carry out combustion with fuel injectors 66 and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders may be deactivated to provide a specific firing (e.g., skip-firing or rolling VDE) pattern based on a designated control algorithm. More specifically, selected "skipped" cylinders are not fired while other "active" cylinders are fired. Optionally, a spark timing associated with a selected firing of a selected working chamber may also be adjusted based on a firing order or firing history of the selected working chamber. As used herein, the firing pattern or deactivation pattern may include a total number of deactivated cylinders to remaining active cylinders, as well as an identity of the deactivated and active cylinders. The firing pattern may further specify a total number of combustion events for which each deactivated cylinder is held deactivated, and/or a number of engine cycles over which the pattern is operated. The engine controller 12 may be configured with suitable logic, as described below, for determining a cylinder deactivation (or skip-firing) pattern based on engine operating conditions. For example, the controller may select a desired induction ratio to apply based on engine operating parameters, including operator torque demand, and then select a cylinder deactivation pattern that enables the desired induction ratio to be provided. As used herein, the induction ratio is defined as the number of actual cylinder induction events (e.g., cylinders firing) that occur divided by the number of cylinder induction event opportunities (e.g., total engine cylinders).

Engine controller 12 may include a drive pulse generator and a sequencer for determining a cylinder pattern that provides the desired induction ratio based on the desired engine output at the current engine operating conditions. For example, the drive pulse generator may use adaptive predictive control to dynamically calculate a drive pulse signal that indicates which cylinders are to be fired and at what intervals to obtain the desired output (that is, the cylinder firing/skip-firing pattern). The cylinder firing pattern may be adjusted to provide the desired output without generating excessive or inappropriate vibration within the engine. As such, the cylinder pattern may be selected based on the configuration of the engine, such as based on whether the engine is a V-engine, an in-line engine, the number of engine cylinders present in the engine, etc. Based on the selected cylinder patter, the individual cylinder valve mechanisms of the selected cylinders may be closed while fuel flow and spark to the cylinders are stopped, thereby enabling the desired induction ratio to be provided.

Since optimal efficiency for a given cylinder is near full output, a lower frequency of firing events may be chosen to reduce output. For example, skipping every other cylinder would produce half of the power, on average. In addition, a spacing between the firing events may be adjusted to minimize NVH. Whether all of the cylinders are included in the skip-firing pattern may depend on the fraction of the full engine output desired, the full engine torque output itself depending upon various conditions, such as cam timing, cylinder temperature, etc.

In this way, by adjusting the cylinder pattern of individual cylinder valve mechanisms and individual cylinder fuel injectors, a desired engine output can be provided by operating fewer cylinders more efficiently, thereby improving fuel economy.

Engine 10 may be controlled at least partially by a control system including controller 12. Controller 12 may receive various signals from sensors 16 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors. In addition, controller 12 may receive an indication of throttle position from a throttle position sensor. Turning now to FIG. 2, an example embodiment 200 of a combustion chamber or cylinder of internal combustion engine 10 (such as engine 10 of FIG. 1) is shown. Components previously introduced in FIG. 1 may be similarly numbered. Engine 10 may be coupled to a propulsion system, such as vehicle 5 configured for on-road travel.

Engine 10 may receive control parameters from a control system including controller 12 (such as controller 12 of FIG. 1) and input from a vehicle operator 130 via an input device 132. In this example, input device 132 includes an accelerator pedal and a pedal position sensor 134 for generating a proportional pedal position signal PP. Cylinder (herein also "combustion chamber") 15 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system (not shown).

Cylinder 15 can receive intake air via a series of intake air passages 142, 144, and 146. Intake air passage 146 may communicate with other cylinders of engine 10 in addition to cylinder 15. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 or alternatively may be provided upstream of compressor 174.

Exhaust passage 148 may receive exhaust gases from other cylinders of engine 10 in addition to cylinder 15. Exhaust gas sensor 128 is shown coupled to exhaust passage 148 upstream of emission control device 178, which is part of emission control system 30, as shown in FIG. 1. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 15 is shown including at least one poppet-style intake valve 150 and at least one poppet-style exhaust valve 156 located at an upper region of cylinder 15. In some embodiments, each cylinder of engine 10, including cylinder 15, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT), and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 15 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

As elaborated with reference to FIG. 1, engine 10 may be a variable displacement engine wherein the intake and exhaust valves are selectively deactivatable responsive to operator torque demand to operate the engine at a desired induction ratio, with a selected cylinder deactivation (or firing) pattern.

In some embodiments, each cylinder of engine 10 may include a spark plug 192 for initiating combustion. Ignition system 190 can provide an ignition spark to cylinder 15 via spark plug 192 in response to spark advance signal SA from controller 12, under select operating modes. In other embodiments, such as where cylinder combustion is initiated using compression ignition, the cylinder may not include a spark plug.

In some embodiments, each cylinder of engine 10 may be configured with one or more injectors for delivering fuel to the cylinder. As a non-limiting example, cylinder 15 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 15 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 15. While FIG. 1 shows injector 166 positioned to one side of cylinder 15, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

As elaborated with reference to FIG. 1, engine 10 may be a variable displacement engine wherein fuel injector 166 is selectively deactivatable responsive to operator torque demand to operate the engine at a desired induction ratio, with a selected cylinder deactivation (or firing) pattern.

Fuel injector 170 is shown arranged in intake passage 146, rather than in cylinder 15, in a configuration that provides what is known as port injection of fuel (hereafter referred to as "PFI") into the intake port upstream of cylinder 15. Fuel injector 170 may inject fuel, received from fuel system 8, in proportion to the pulse width of signal FPW-2 received from controller 12 via electronic driver 171. Note that a single electronic driver 168 or 171 may be used for both fuel injection systems, or multiple drivers, for example electronic driver 168 for fuel injector 166 and electronic driver 171 for fuel injector 170, may be used, as depicted.

Fuel may be delivered by both injectors to the cylinder during a single cycle of the cylinder. For example, each injector may deliver a portion of a total fuel injection that is combusted in cylinder 15. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 15.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 144 may be varied by controller 12 via EGR valve 143. Further, an EGR sensor 145 may be arranged within the EGR passage and may provide an indication of one or more of pressure, temperature, and concentration of the exhaust gas.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Controller 12 is shown as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of engine coolant temperature (ECT) from temperature sensor 116 coupled to cooling sleeve 118; a profile ignition pickup signal (PIP) from Hall effect sensor 120 (or other type) coupled to crankshaft 140; throttle position (TPS) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory chip 110 can be programmed with computer readable data representing instructions executable by microprocessor unit 106 for performing the methods described below as well as other variants that are anticipated but not specifically listed.

The controller 12 receives signals from the various sensors of FIGS. 1-2 and employs the various actuators of FIGS. 1-2 to adjust engine operation based on the received signals and instructions stored on a memory of the controller. For example, responsive to an operator torque command, as inferred from the pedal position sensor, the controller may send a signal to a throttle actuator to adjust a throttle opening, the opening increased as the torque demand increases. As another example, responsive to a desired induction ratio determined based on operator torque demand, the controller may send signals to selected cylinder fuel injectors and valves to selectively deactivate those cylinders in accordance with a cylinder deactivation pattern that provides the desired induction ratio.

During operation of the engine in the VDE mode with one or more cylinders selectively deactivated, torque may be monitored via one or more monitors to ensure that the actual induction ratio matches the commanded induction ratio. For example, as elaborated with reference to FIG. 4, by comparing the air flow through the throttle, as estimated via a throttle body based model, with changes in manifold pressure across the throttle (e.g., from a MAP sensor), the dynamic effect of actual inducting cylinders may be learned. This may be used to infer not only the actual induction ratio, but also the actual torque being provided. By constraining the induction ratio applied at engine operating conditions where air flow metering is inaccurate, such as at or near WOT, the likelihood of delivering more engine torque than is requested by the operator, such as due to operation at an actual induction ratio that is greater than the desired induction ratio, may be averted.

Figure 3:
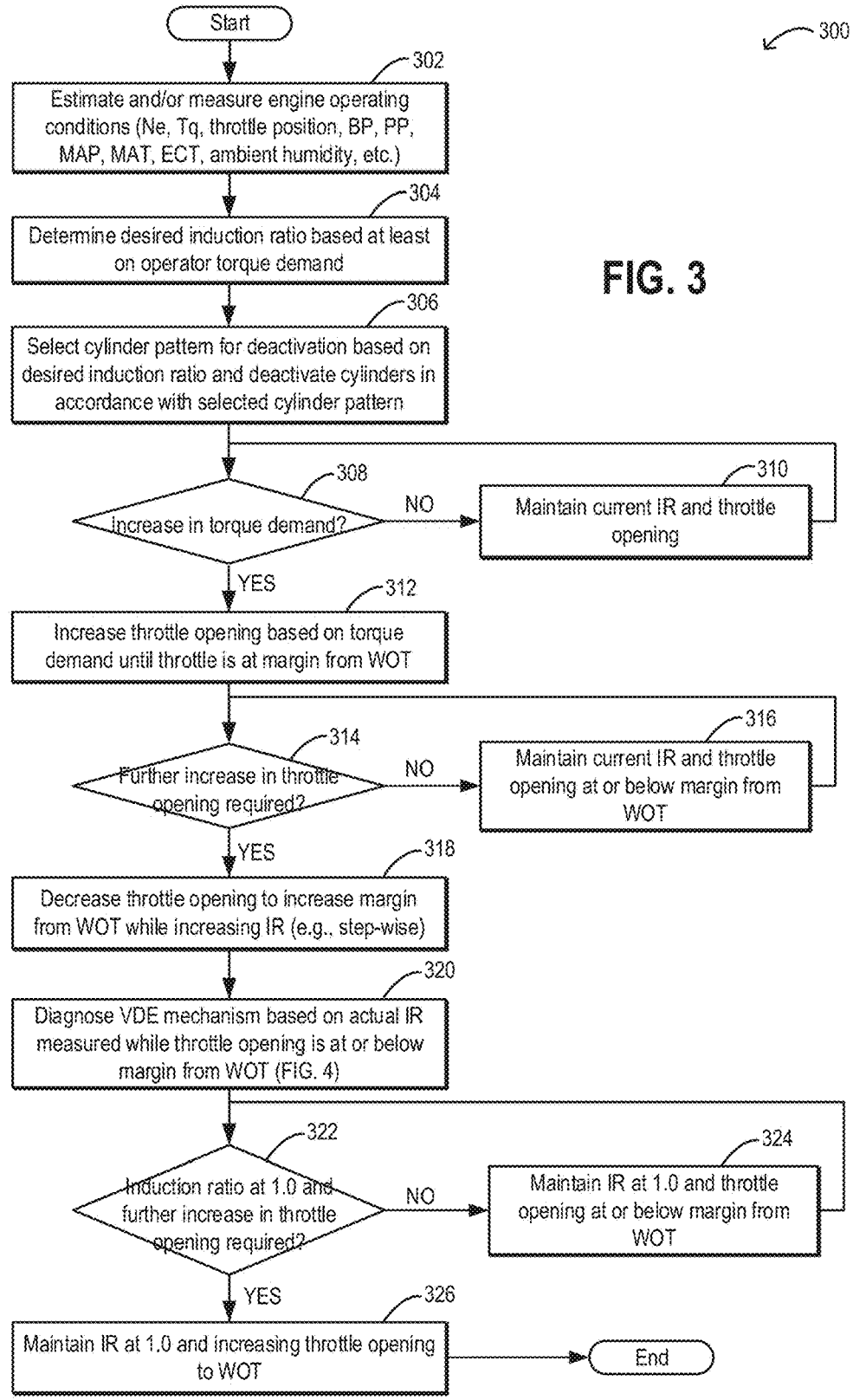
FIG. 3 shows an example routine that may be implemented for operating an engine, including controlling the induction ratio responsive to a throttle position.
Figure 4:
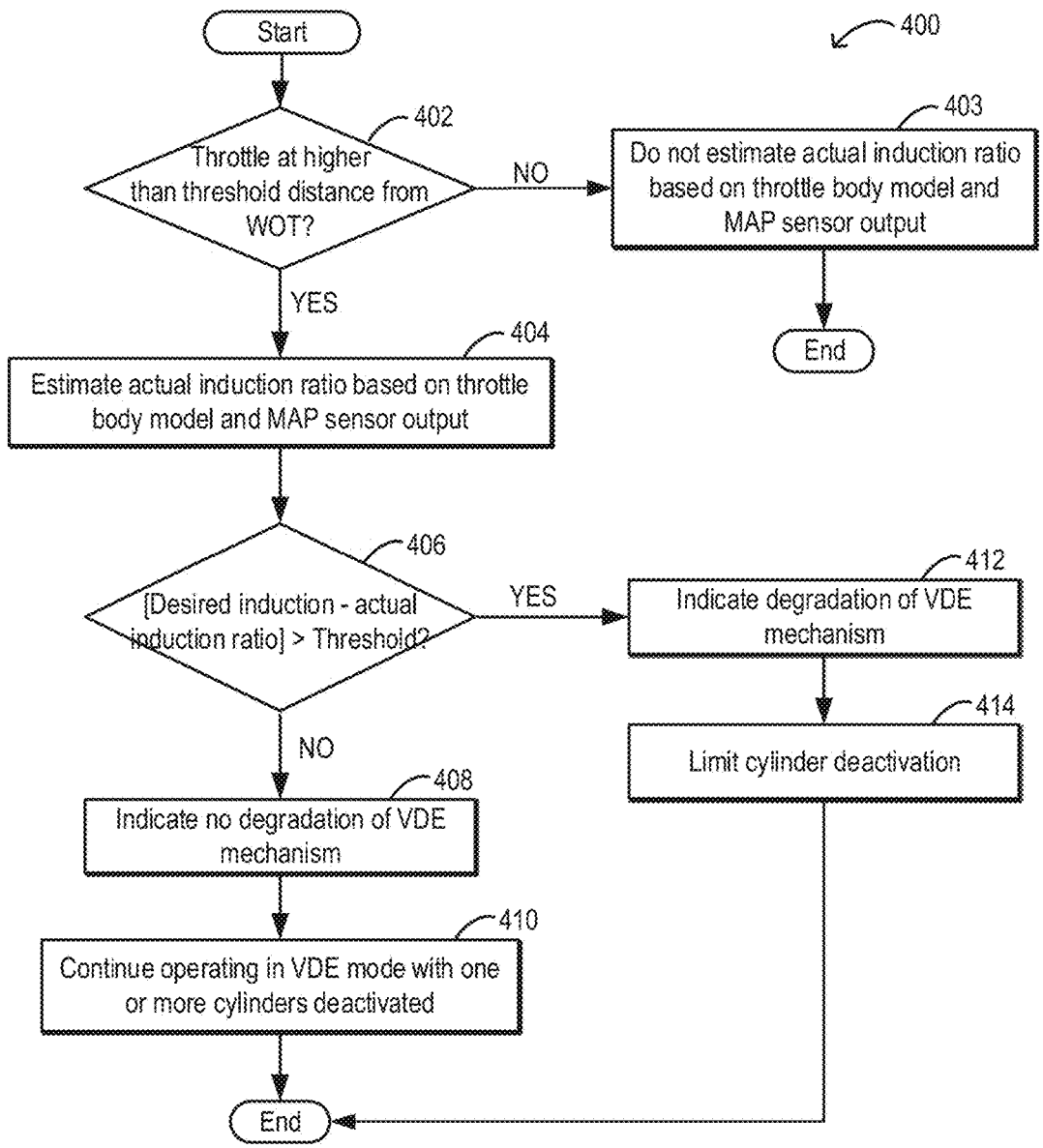
FIG. 4 shows an example routine that may be implemented for diagnosing VDE degradation based on measured induction ratio.

For example, as elaborated with reference to FIGS. 3-4 and FIG. 6, controller 12 may employ air flow based torque monitoring methods to compare the desired amount of torque to the amount of torque actually being generated by the engine 10 while operating with one or more cylinders selectively deactivated. In one example, the controller may apply a selected cylinder deactivation pattern that provides a desired induction ratio based on operator torque demand and then estimate an actual induction ratio to characterize the torque being generated by the engine. If the difference between the desired induction ratio and the estimated actual induction ratio exceeds a threshold difference, degradation of the VDE mechanisms may be inferred and mitigating actions may be performed, such as by limiting the range of induction ratios that can be provided during subsequent engine operation.

In this way, the components of FIGS. 1 and 2 provides an engine system comprising a variable displacement engine; a plurality of cylinders, each having selectively deactivatable valve mechanisms and a selectively deactivatable fuel injector; a manifold pressure sensor; a throttle position sensor; an intake throttle; and a controller. The controller may be configured with computer-readable instructions stored on non-transitory memory for: selectively deactivating a number of the plurality of cylinders to provide a commanded induction ratio based on operator torque demand; increasing throttle opening as a function of increasing operator torque demand while maintaining the commanded induction ratio until throttle position is at a threshold distance of wide open throttle; and when the throttle position is at the threshold distance of wide open throttle, increasing the commanded induction ratio by selectively reactivating one of the number of deactivated cylinders while decreasing the throttle opening to move the throttle position to higher than the threshold distance of wide open throttle. The controller may include further instructions for, responsive to increasing operator torque demand while the throttle position is at the threshold distance of wide open throttle and the commanded induction ratio is increased to 1.0, maintaining all the plurality of cylinders active; and increasing the throttle opening to move the throttle position to wide open throttle. The controller includes further instructions for responsive to each of the throttle position being outside the threshold distance of wide open throttle, estimating an actual induction ratio of the engine based on modeled mass air flow through the throttle relative to sensed manifold pressure change across the throttle; estimating a torque error based on the actual induction ratio relative to the commanded induction ratio; and updating the commanded induction ratio based on the torque error, wherein the modeled mass air flow is not based on the output of a mass air flow sensor. The controller includes further instructions for indicating degradation of the selectively deactivatable valve mechanisms or the selectively deactivatable fuel injector responsive to a difference between the commanded induction ratio and the estimated actual induction ratio being higher than a threshold; and responsive to the indicating, reactivating the selectively deactivated one or more of the plurality of cylinders.

Turning now to FIG. 3, an example routine 300 is shown for maintaining an intake throttle at a margin from WOT even as operator torque demand increases by coordinating throttle adjustments with induction ratio adjustments. Instructions for carrying out routine 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below. In one example, the controller may control an engine induction ratio based on sensor input indicative of an operator torque demand. In particular, based on input from an accelerator pedal position sensor, or other torque requestor, indicative of a drop in operator torque demand, the controller may send a signal to a selected number of individual cylinder valve mechanisms and fuel injectors to selectively deactivate fuel and valve operation of the selected cylinders while continuing to operate remaining engine cylinders with fuel and valve operation active, thereby providing the desired induction ratio and the desired torque.

At 302, the routine includes estimating and/or measuring engine operating conditions including engine speed, operator torque demand, throttle position, barometric pressure (BP), boost pressure, accelerator pedal position (PP), manifold absolute pressure (MAP), mass air flow (MAF), engine dilution (e.g., EGR level), manifold air temp (MAT), engine coolant temperature (ECT) and ambient humidity.

At 304, the routine includes determining a desired induction ratio based at least on operator torque demand. The engine cylinder induction ratio is an actual total number of cylinder firing events divided by an actual total number of cylinder compression strokes over an actual total number of cylinder compression strokes. In one example, the actual total number of cylinder compression strokes is a predetermined number. As used herein, cylinder activation event refers to a cylinder firing with intake and exhaust valves opening and closing during a cycle of the cylinder while a cylinder deactivation event refers to a cylinder not firing with intake and exhaust valves held closed during a cycle of the cylinder. An engine event may be a stroke of a cylinder occurring (e.g., intake, compression, power, exhaust), an intake or exhaust valve opening or closing time, time of ignition of an air-fuel mixture in the cylinder, a position of a piston in the cylinder with respect to the crankshaft position, or other engine related event. The engine event number corresponds to a particular cylinder. For example, engine event number one may correspond to a compression stroke of cylinder number one. Engine event number two may correspond to a compression stroke of cylinder number three. A cycle number refers to an engine cycle which includes one event (activation or deactivation) in each cylinder. For example, a first cycle is completed when each cylinder of an engine has completed all 4 stroke events (intake, exhaust, compression, and expansion events), in the firing order. The second cycle starts when each cylinder of the engine starts another iteration of all 4 stroke events. The target or desired induction ratio may be determined from the operator requested engine torque. In particular, allowable engine cylinder firing fraction values may be stored in a table or function that may be indexed by desired engine torque and engine speed. Engine cylinder firing fraction values that may provide the requested engine torque may be part of a group of available engine cylinder firing fraction values. Then, based on other vehicle operating conditions, some engine cylinder firing fractions may be eliminated from the group of available engine cylinder firing fraction values. For example, some engine cylinder firing fractions may be removed from the group if the cylinder firing fractions provide higher levels of engine vibration. Then, the engine cylinder firing fraction that provides the fewest number of active engine cylinders during a cycle may be selected from the group of available engine cylinder firing fraction values to provide the desired engine cylinder firing fraction. In this way, a single desired engine cylinder firing fraction may be selected from a group of a large number of engine cylinder firing fractions. It will be appreciated that the selected engine cylinder firing fraction may then be provided via one of a plurality of possible cylinder deactivation patterns, as elaborated below.

As one example, a target induction ratio of 1/2 (or 0.5) implies that for every 2 cylinder events, one cylinder is fired and one is skipped. As another example, a target induction ratio of 1/3 (or 0.33) implies that for every 3 cylinder events, one cylinder is fired and the remaining two are skipped.

At 306, the routine includes selecting a cylinder pattern for deactivation that provides the desired induction ratio. As an example, an induction pattern for an induction ratio of 1/2 may include every other cylinder being selectively not fueled to produce half of the power, on average. Further, the same pattern may be applied for each consecutive engine cycle such that the same cylinders are skipped on consecutive engine cycles while the remaining cylinders are fired on each of the engine cycles, giving rise to a stationary pattern. In one example, where cylinders 1-8 are arranged as two banks of 4 cylinders each (bank one having cylinders 1-4, and bank two having cylinders 5-8), with a firing order of 1-5-4-2-6-3-7-8, an induction ratio of 1/2 may be provided by firing according to the induction pattern S-5-S-2-S-3-S-8 wherein S represents a skipped cylinder event.

As another example, an induction pattern for an induction ratio of 1/3 may include two out of every three cylinders being selectively not fueled to produce a third of the power, on average. Further, the induction ratio may be provided by different cylinders being skipped on each engine cycle, giving rise to a non-stationary pattern. In one example, where cylinders 1-8 are arranged as two banks of 4 cylinders each (bank one having cylinders 1-4, and bank two having cylinders 5-8), with a firing order of 1-5-4-2-6-3-7-8, an induction ratio of 1/3 may be provided by firing according to the pattern 1-S-S-2-S-S-7-S-S-5-S-S-6-S-S-8-S-S-4-S-S-3-S-S, wherein S represents a skipped cylinder event.

In each of the above examples, by spacing the firing events out evenly, NVH caused due to the varying torque output is minimized. In this way, by adjusting the cylinder pattern of individual cylinder valve mechanisms and individual cylinder fuel injectors, a desired engine output can be provided by operating fewer cylinders more efficiently, thereby improving fuel economy.

Once the cylinder pattern corresponding to the desired induction ratio is selected, the controller may deactivate cylinders in accordance with the selected cylinder pattern to provide the target induction ratio. The selective cylinder deactivation includes, for the selected cylinders to be deactivated, holding the cylinder valves closed, with no fuel injected into the cylinders, for an entire engine cycle of 720 crank angle degrees (that is, for all 4 strokes of a cylinder).

In one example, cylinder deactivation may include closing the selected individual cylinder valve mechanisms (e.g., VDE mechanisms), such as intake valve mechanisms, exhaust valve mechanisms, or a combination of both by sending a valve closing command from the controller to valve actuators. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. In addition, fuel flow and spark to the deactivated cylinders may be stopped, such as by deactivating cylinder fuel injectors and disabling a spark signal commanded to a given cylinder's spark plug.

It will be appreciated that the decision to activate or deactivate a cylinder and open or close the cylinder's intake and exhaust valve may be made a predetermined number of cylinder events (e.g., one cylinder event, or alternatively, one cylinder cycle or eight cylinder events) before the cylinder is to be activated or deactivated to allow time to begin the process of opening and closing intake and exhaust valves of the cylinder. For example, for an eight cylinder engine with a firing order of 1-3-7-2-6-5-4-8, the decision to activate or deactivate cylinder number seven may be made during an intake or compression stroke of cylinder number seven one engine cycle before cylinder number seven is activated or deactivated. Alternatively, the decision to activate or not activate a cylinder may be made a predetermined number of engine events or cylinder events before the selected cylinder is activated or deactivated. In still further examples, the number of cylinder events may be adjusted based on hardware capabilities and current engine operating conditions.

In addition to adjusting the induction ratio, the controller may also set a throttle opening based on the operating conditions including the torque demand to provide a manifold air flow based on the selected induction ratio. In one example, when operating with a lower induction ratio, when a portion of the cylinders are deactivated, the engine may be operated with a larger throttle opening to provide a higher air flow to each of the smaller number of active cylinders each operating with a higher displacement. In comparison, the engine may be operated with a smaller throttle opening to provide a smaller air flow to each the larger number of active cylinders each operating with a smaller displacement.

At 308 it may be determined if there is an increase in operator torque demand. In one example, the torque demand may increase due to the operator applying an accelerator pedal during a tip-in event. As another example, the torque demand may increase during vehicle travel on an incline. If an increase in torque demand is not confirmed, at 310, the method includes maintaining the current throttle position and the current induction ratio. That is, a degree of throttle opening may be maintained and the engine may continue to operate with one or more cylinders selectively deactivated.

If an increase in torque demand is confirmed, at 312, the method includes increasing throttle opening as torque demand increases until the intake throttle position is at a margin from WOT. That is, as torque demand increases, while maintaining the induction ratio and the selected one or more cylinders selectively deactivated, the controller may meet the torque demand by increasing air flow to the cylinders by moving the intake throttle to a more open position. The throttle opening may be increased as a function of increasing operating torque demand (such as via a look-up table, model, or algorithm) until the throttle position is within a threshold distance of WOT, the threshold distance defining a margin from WOT. If the intake throttle is opened beyond this margin (and moved to or towards WOT position), air flow metering modeled on throttle position may be prone to inaccuracies, resulting in potential torque errors. In addition, the actual induction ratio may not be accurately determined. The threshold distance may be a predefined value. Further, the threshold distance may vary with engine speed.

Next, at 314, it may be determined if a further increase in throttle opening is required. For example, during extended vehicle driving on an incline, or where the incline angle is very steep, the increase in torque demand may not be sufficiently met by increasing the throttle opening to the threshold distance of WOT. Rather, additional air flow may be required, such as can be provided by moving the throttle to WOT. In one example, the controller may refer a look-up table wherein the operator torque demand is the input and the desired throttle position is the output. If the desired throttle position is determined to be WOT, the routine may proceed to 318. If a further increase in throttle opening is not required, at 316, the method includes maintaining the selected IR and continuing to adjust the throttle opening based on torque demand while maintaining the throttle position at a threshold distance from WOT.

If a further increase in throttle opening is confirmed, then at 318, responsive to the intake throttle already being at the threshold distance from WOT, the method includes increasing the induction ratio while decreasing the throttle opening to move the throttle to a less open position where there is a higher than threshold distance from WOT. As a result, there is an increase in the margin from WOT. In one example, the induction ratio may be step-wise incremented to the next possible induction ratio achievable by reactivating one cylinder at a time. As one example, if the engine is a 4-cylinder engine that was operating with an induction ratio of 0.5 with 2 cylinders deactivated and 2 cylinders active, the engine may reactivate one of the deactivated cylinders and transition to operating with an induction ratio of 0.67 with 1 cylinder deactivated and 3 cylinders active. As another example, if the 4-cylinder engine was operating with an induction ratio of 0.67 with 1 cylinder deactivated and 3 cylinders active, the engine may reactivate the deactivated cylinder and transition to operating with an induction ratio (IR) of 1.0 with all cylinders active.

Since the average cylinder air flow requirement decreases as the number of active cylinders increases, by increasing the induction ratio, the throttle opening may be correspondingly decreased, thereby increasing the distance of the throttle position from WOT. As a result, by increasing the induction ratio, the engine continues to operate at a margin from WOT where air flow metering remains reliable. The change in throttle position (and increase in margin) may correspond to the increase (change) in induction ratio. With reference to the earlier example, the throttle position may change by a smaller amount when the increase in induction ratio is from 0.5 to 0.67 (smaller effective change in IR) and change by a larger amount when the increase in induction ratio is from 0.67 to 1.0 (larger effective change in IR).

In this way, as the operator torque demand changes, the controller may continue to adjust the induction ratio and throttle opening in coordination to maintain a margin of the intake throttle position from WOT. For example, as operator torque demand increases, the controller may increase throttle position towards the threshold distance while maintaining a first induction ratio until throttle position reaches the threshold distance. Thereafter, the controller may decrease throttle position away from the threshold distance while step-wise incrementing the induction ratio from the first induction ratio to a second, higher induction ratio. As operator torque demand increases while in the second induction ratio, the controller may increase throttle position towards the threshold distance while maintaining the second induction ratio until throttle position once again reaches the threshold distance. Thereafter, the controller may decrease throttle position away from the threshold distance while step-wise incrementing the induction ratio from the second induction ratio to a third, higher induction ratio (towards 1.0), and so on. At 320, the method includes diagnosing the VDE mechanism based on actual IR relative to commanded IR, the actual IR measured (or modeled) while the intake throttle is at more than the threshold distance from WOT. As elaborated at FIG. 4, the controller may model the intake air flow based on throttle position more reliably at this position, and use the air flow estimation to compute a torque corresponding to the actual IR.

At 322, it may be determined if the induction ratio is at 1.0 and a further increase in throttle opening (beyond the threshold distance) is required. If not, at 324, the controller may continue coordinating induction ratio and throttle opening adjustments. For example, the controller may maintain the applied induction ratio and maintain the throttle at a position with margin from WOT. As described earlier, each time operator torque demand increases and throttle opening reaches the threshold distance from WOT, the controller may increment the induction ratio and move the throttle position further away from WOT. Once the induction ratio has been incremented to 1.0, where all cylinders are active, and the throttle opening reaches the threshold distance, a further increase in torque demand cannot be met by further increasing the induction ratio. Therefore, if the induction ratio is at 1.0 and a further increase in throttle opening to beyond the threshold distance is required, at 326, the controller may meet the increased torque demand by maintaining the induction ratio at 1.0 while increasing the throttle opening to WOT. In this way, the throttle may be moved to a WOT position only when the induction ratio has already been incremented to 1.0 (all cylinders are active) and a further increase in torque demand can only be met by throttle adjustments.

By limiting engine operation with throttle at WOT, torque delivery is improved. In particular, air flow metering using a throttle based model may be unreliable when the throttle is at WOT. As a result, an engine controller may not be able to reliably determine if the actual induction ratio applied is the commanded induction ratio. If the actual induction ratio is higher than the commanded induction ratio, there is a possibility that more torque is delivered than is desired, causing drivability issues that may be objectionable to the driver. For example, the commanded induction ratio may be calibrated such that the torque is delivered with an intake pressure being 95% of ambient pressure. However, this results in the throttle position increasing its threshold value. In such a case, the induction ratio would be increased to the next higher available induction ratio in order to avoid operating in the region where the throttle model is not accurate. By maintaining the throttle at a threshold distance from WOT via induction ratio adjustments even as torque demand changes, the actual induction ratio can be more reliably measured and accounted for. In addition, over-torque can be averted. Further, as elaborated at FIG. 4, VDE degradation can be detected earlier and addressed in a timely manner.

Turning now to FIG. 4, method 400 enables diagnosing of a VDE engine based on reliable and accurate air-flow estimations performed while the throttle is away from WOT. By limiting an engine induction ratio based on a throttle position to reduce inaccuracies in air flow measurement, and air flow based torque measurements, VDE diagnostics may be performed with higher confidence. In one example, the method of FIG. 4 is performed as part of the method of FIG. 3, such as at 320.

At 402, it may be confirmed that the throttle is at a position that is at or more than a threshold distance from WOT. For example, it may be confirmed that a required margin is maintained from WOT. When the margin is provided, air flow metering via a throttle body model may be more reliable and therefore can be used for VDE diagnostics. If the throttle is not at the threshold distance, such as when the throttle is already at or around WOT, the method moves to 403 where the actual induction ratio is not estimated based on throttle body model and MAP sensor output. For example, torque and induction ratio adjustments are not performed in closed loop based on the throttle body model. In addition, VDE diagnostics are not initiated. The method then ends.

At 404, the routine includes estimating an actual induction ratio in accordance with an air flow estimation that is based on a throttle body model and MAP sensor output, as elaborated with reference to FIG. 6. The throttle body model may be based on an orifice flow equation for compressible flow (see Eq. 1 shown below) and includes parameters such as throttle angle to determine cross-sectional area of the orifice hole, ambient conditions to characterize the airflow, engine speed to determine the flow rates, and a manifold absolute pressure sensor output to characterize upstream and downstream pressures across the throttle.

$$q_m = CA_2 \sqrt{2\rho_1 p_1 \left(\frac{k}{k-1}\right)[(p_2/p_1)^{2/k} - (p_2/p_1)^{(k+1)/k}]}$$

where:
$q_m$=mass flow rate (at any cross-section), kg/s
C=orifice flow coefficient, dimensionless
$A_2$=cross-sectional area of the orifice hole, m$^2$
$p_1$=fluid upstream pressure, Pa with dimensions of kg/(m·s$^2$)
$p_2$=fluid downstream pressure, Pa with dimensions of kg/(m·s$^2$)
k=specific heat ratio, dimensionless
$q_{v,1}$=volume flow rate under upstream conditions, m$^3$/s
$\rho_1$=real gas density under upstream conditions, kg/m$^3$ It will be appreciated that averaging MAP data and airflow estimates (such as based on the output of existing MAP and/or MAF sensors of the engine) over one or more cylinder events may be used to improve robustness of the throttle body model to pressure pulsations. By using a throttle body model to estimate the air flow through the system during conditions when the air flow metering is not prone to inaccuracies, torque and induction ratio estimation can be performed accurately with reduced reliance on a MAF sensor, thereby reducing costs.

At 406, the routine includes comparing the desired induction ratio to the estimated actual induction ratio and determining whether the absolute difference between the desired induction ratio and the estimated actual induction ratio is greater than a threshold. In some examples, the threshold may be determined based upon an acceptable error of the estimated actual induction ratio. The acceptable error in induction ratio may correspond to an acceptable torque error that is not perceivable or objectionable to a vehicle operator. As one example, if the acceptable error in torque is 10% of the maximum torque, then the acceptable induction ratio error may be 0.1. Alternatively, the threshold may be based on expected degradation scenarios of the VDE mechanisms, such as based on acceptable levels of VDE wear and tear.

It will be appreciated that while the routine depicts determining if absolute difference between the desired induction ratio and the estimated actual induction ratio is greater than a threshold, in alternate examples, it may be determined if the estimated actual induction ratio is greater than the desired induction ratio so as to mitigate over-torque conditions where more engine torque is delivered than desired.

If the absolute difference between the desired induction ratio and the estimated actual induction ratio is greater than a threshold, the routine proceeds to 412, where the routine includes indicating degradation of the VDE mechanism. At 414, the routine includes limiting cylinder deactivation during subsequent engine operation when engine operation with cylinder deactivation may be possible responsive to the indication of degradation. In one example, limiting cylinder deactivation may include operating at a higher induction ratio than desired for the given engine operating conditions by maintaining certain cylinders active, rather than deactivating them.

If the absolute difference between the desired induction ratio and the estimated actual induction ratio is not greater than a threshold, the routine continues to 408, where no degradation of VDE mechanism is indicated. At 410, the controller continues operating the engine in the VDE mode with the one or more cylinders deactivated, and the method ends.

In addition, the controller may resume reassessing if there is a change in operating condition causing the throttle to be within a threshold of WOT (as discussed at FIG. 3) or if the pressure ratio across the throttle (throttle pressure ratio, or TR) is within a threshold pressure ratio. The throttle pressure ratio is defined as the pressure before the throttle divided by the pressure after the throttle, as may be measured by existing pressure sensors. In some examples, this may include controlling the desired induction ratio based on manifold absolute pressure (MAP), such as MAP sensor 124 of FIG. 1. In one example, the desired induction ratio may be controlled such that the MAP remains less than or equal to barometric pressure (BP)*(1−throttle pressure ratio). In other words, the desired induction ratio is to remain greater than the estimated actual induction ratio to deliver torque with an intake pressure equal to barometric pressure (BP)* (1−throttle pressure ratio).

If the throttle is within a threshold of wide-open-throttle or the pressure ratio is within a threshold of 1, the controller continues to increase the induction ratio incrementally (such as by one step or degree) and/or reactivating one or more cylinders in accordance with the induction ratio increment, as discussed at FIG. 3. In one example, reactivation of a cylinder may include selectively reactivating cylinder valves via hydraulically actuated lifters, via a cam profile switching mechanism. In other examples, reactivation of a cylinder may include selectively reintroducing spark and/or fuel to the cylinder selected for reactivation. The reactivated cylinder may be a next cylinder in the firing order.

It will be appreciated that the method of FIGS. 3-4 may be continuously performed during engine operation, as operator torque demand and engine induction ratio changes. Alternatively, the method of FIGS. 3-4 may be triggered responsive to a change in operator torque demand necessitating a change in throttle position or a change in induction ratio.

In this way, a variable displacement engine may be operated with an induction ratio based on operator torque demand; and responsive to throttle position being within a threshold distance of wide open throttle, independent of the operator torque demand, the induction ratio may be increased. Operating with an induction ratio based on operator torque demand includes operating with a higher induction ratio when the operator torque demand is higher and operating with a lower induction ratio when the operator torque demand is lower, the higher induction ratio provided by selectively deactivating fewer engine cylinders, the lower induction ratio provided by selectively deactivating more engine cylinders. In one example, increasing the induction ratio may include incrementally increasing a number of active cylinders by incrementally reactivating selectively deactivated cylinders. In another example, increasing the induction ratio includes constraining the induction ratio to 1.0. The induction ratio may be a commanded induction ratio, the method further comprising, estimating an actual induction ratio based on a modeled mass air flow through the throttle relative to a sensed manifold pressure rate of change across the throttle, comparing the commanded induction ratio to the estimated actual induction ratio, and indicating degradation of a variable displacement engine mechanism based on the comparing. The indication may include indicating responsive to a difference between the commanded induction ratio and the estimated actual induction ratio being higher than a threshold difference. Further, responsive to the indication, selective cylinder deactivation may be disabled independent of the operator torque demand. The modeled mass air flow may be modeled based on a throttle position when the throttle position is outside the threshold distance of wide open throttle. In particular, the modeled mass air flow is not based on the output of a mass air flow sensor. Estimating the actual induction ratio may include estimating an actual engine torque output based on the modeled mass air flow through the throttle relative to a sensed manifold pressure rate of change across the throttle, estimating a torque error based on the actual engine torque relative to a desired torque based on the commanded induction ratio; and estimating the actual induction ratio based on the commanded induction ratio and the torque error. Further, responsive to the commanded induction ratio being within a threshold of 1.0, independent of the operator torque demand and the throttle position, the induction ratio may be increased.

Turning now to FIG. 6, an example torque estimation method 600 is shown that enables torque to be accurately determined with reduced reliance on a MAF sensor. The method enables an actual torque to be compared to a desired torque, so that an actual induction ratio can be compared to a commanded or desired induction ratio, and engine operation can be adjusted to avoid over-delivery of torque.

Method 600 includes estimation of air flow metering, or mass air flow (MAF) at 602. To reduce the reliance on costly MAF sensors, MAF is determined using a throttle body model as a function of throttle position, manifold pressure, and barometric pressure (BP). The throttle body model may be based on an orifice flow equation for compressible flow (see Eq. 1 earlier) and includes parameters such as throttle angle to determine cross-sectional area of the orifice hole (herein across the throttle), ambient conditions to characterize the airflow (herein BP). The method compares the mass air flow to a measured change in manifold pressure across the throttle based on the output of a MAP sensor. The MAP sensor output characterizes a pressure downstream of the throttle while a BP sensor, compressor outlet pressure sensor, or throttle inlet pressure sensor characterizes a pressure upstream of the throttle. The rate of change of MAP 404 reflects the dynamic effect of the actual inducting cylinders of the engine. By calculating averages over one or more cylinder events, robustness of the torque estimation to pressure pulsations is improved while at the same time providing sufficient mitigation response. Using this approach, the controller may detect an error between the desired induction ratio and actual induction ratio. When the error is present, the controller may indicate a degradation of the VDE system. The comparison of air flow and change in MAP is then used along with an estimate of engine speed 406 to determine an actual induction ratio 408. The engine load 410 and the actual induction ratio 408 are then used as inputs to an indicated torque look-up table 412. By comparing the desired induction ratio to the output of the indicated torque look-up table, a torque error 414 may be learned which is then used to output an estimated indicated torque 416. This torque estimation is then used for adjusting engine operation and diagnosing VDE degradation.

Turning now to FIG. 5, an example timeline of operation of a variable displacement engine is shown. The engine may have the capability of performing a throttle body model-based VDE system diagnostic routine, such as the VDE system diagnostic routine shown in FIG. 4. The throttle position and induction ratio of the engine may be coordinated responsive to torque demand changes via a controller performing a control routine, such as the routine of FIG. 3.

Therein, by selectively constraining the desired induction ratio responsive to a throttle position, the likelihood of overdelivering torque may be reduced. By using a throttle body model to map the air flow across the throttle, the need for a MAF sensor may be reduced, providing component cost and complexity benefits. The map 500 of FIG. 5 depicts an accelerator pedal position (PP) at plot 502, a throttle position (or degree of opening) relative to WOT at plot 504, a MAP sensor output at plot 506, a commanded induction ratio at plot 508, and a flag indicating VDE degradation at plot 512. All plots are depicted over time along the x-axis. In addition, the magnitude of a parameter represented in any given plot increases along the y-axis going from bottom to top, as shown. Time markers t1-t8 depict times where significant events occur.

Prior to time t1, the accelerator pedal (plot 502) is depressed by a large amount, representing an elevated operator torque demand. At this time, the torque demand is met by operating the engine with all cylinders active, as indicated by the induction ratio of 1.0. In addition, the engine is operated with the throttle at a more open position while still maintaining the throttle opening below level 503. As a result, more than a minimum margin 505 is provided from WOT. MAP is reflective of the degree of opening of the throttle, and so is elevated at this time.

At t1, there is a drop in operator torque demand, as indicated by the pedal being released by an amount. For example, the drop in operator torque demand may be due to an operator pedal tip-out. The change in torque demand is met by lowering the induction ratio (IR). Specifically, a plurality of cylinders are selectively deactivated. In the depicted example, the change in torque demand is met by lowering the induction ratio to the lowest possible induction ratio for the given engine configuration. In addition, the opening of the throttle is reduced, but the change in throttle position is not as large as the change in IR. As a result, the change in MAP is also not significant.

At t2, there is a further drop in operator torque demand, as indicated by the pedal being released by a further amount, such as due to a vehicle coasting condition. Since no further drop in IR is possible, the change in torque demand is met by reducing the throttle opening while maintaining the induction ratio (IR) at the lowest setting. At this time, the opening of the throttle is reduced by a larger amount. MAP changes in proportion to the change in throttle opening.

At t3, there is an increase in operator torque demand, such as indicated by the pedal being released by an amount. For example, the increase in operator torque demand may be due to an operator pedal tip-in event, such as when the vehicle is travelling on an uphill segment having a steep grade. The change in torque demand is met by increasing the throttle opening as torque demand increases while maintaining the (lowest) induction ratio (IR). As a result of the change in throttle position, MAP increases.

At t4, the throttle opening reaches level 503 where the minimum margin 505 is provided. However, the pedal is still depressed and operator torque demand continues to increase. If the throttle were moved beyond level 503 towards WOT, torque estimation may be compromised. Therefore to maintain at least the minimum margin 505, responsive to the increase in torque demand, the induction ratio is incremented to the next higher acceptable induction ratio while concurrently throttle opening is decreased. In one example, the next higher acceptable induction ratio may be achieved by reactivating one of the previously deactivated cylinders. Alternatively, the next higher acceptable induction ratio may be achieved by operating with a higher number (e.g., one higher number) of reactivated cylinders. This is because in a rolling VDE mechanism, the identity of the deactivated and reactivated cylinders may be continually adjusted.

Between t4 and t5, responsive to the further increase in torque demand, throttle opening in increased while maintaining the most recent (one step incremented) induction ratio. At t5, the throttle is once again at level 503. Thus at t5, as at t4, responsive to the pedal continuing to be depressed, the induction ratio is incremented by another step by reactivating one more cylinder while concurrently decreasing the throttle opening. The same goes one between t5 and t6 until all cylinders are reactivated and the induction ratio is at 1.0. Each time the throttle opening is decreased, the decrease is by an amount based on the corresponding increase in induction ratio. Further, as the throttle opening increases and decreases, MAP correspondingly increases and decreases. In this way, between t4 and t6, despite the increase in torque demand, the throttle is maintained at least at a minimum margin 505 from WOT.

At t6, the induction ratio is at 1.0 and the throttle opening is at level 503. The accelerator pedal continues to be depressed. At this time, to meet the increased torque demand, the throttle is moved to WOT while all cylinders are maintained active.

Between t0 and t6, the actual induction ratio modeled based on the throttle body model matches the commanded induction ratio and no degradation flag is set. Between t6 and t7, when the throttle is at WOT, the throttle body model is not used and VDE degradation is not determined based on the throttle body model.

At t7, there is a decrease in operator torque demand which is met by lowering the induction ratio and reducing the throttle opening to increase the margin from WOT. As at t1, the induction ratio is lowered to the lowest induction ratio and the throttle opening is reduced by a smaller amount (than the change in induction ratio). Between t7 and t8, the actual induction ratio is determined based on the throttle body model. The actual induction ratio 510 determined based on the throttle body model differs significantly from the commanded induction ratio. In particular, the actual induction ratio 510 is higher than the commanded induction ratio (plot 508) by more than a threshold amount. Responsive to the difference, VDE mechanism degradation is determined and a flag is set at t8. The flag may indicate that fewer cylinders are deactivated than desired, resulting in torque delivery being higher than desired. In one example, this may be due to degradation of the VDE mechanisms, resulting in cylinders not being deactivated as anticipated. In another example, there may be degradation of the control system, resulting in the VDE mechanisms not being actuated to deactivate cylinders. Due to the VDE mechanism degradation, MAP measured when operating with the actual induction 510 that is higher than the commanded induction ratio, is lower than desired or expected. When all cylinders are subsequently activated, actual MAP returns to being the same as the desired or expected MAP.

In addition, responsive to the indication of degradation, cylinder deactivation may be limited during subsequent engine operation. Specifically, even during conditions suitable for operating the engine in VDE mode (e.g., with one or more deactivated cylinders), cylinder deactivation may be limited based upon the degree of degradation. As one example, the commanded induction ratio may be 0.5 while the actual induction ratio may be determined to be 0.75. As a result of the indication of degradation, the induction ratio commanded during subsequent operation may not be dropped below 0.75, thereby limiting the induction ratio to 0.75 or greater.

In this way, an engine controller may selectively deactivate one or more engine cylinders to operate an engine at a commanded induction ratio based on operator torque demand; estimate an actual induction ratio based on modeled mass air flow through an intake throttle relative to a sensed manifold pressure change across the throttle; and indicate degradation of a selectively cylinder deactivation mechanism based on the commanded induction ratio relative to the estimated actual induction ratio. The controller may further, in response to throttle position being within a threshold distance of wide open throttle, independent of the operator torque demand, constrain the commanded induction ratio to 1.0. Constraining the commanded induction ratio to 1.0 may include operating the engine with all cylinders active. Herein, the modeled mass air flow may be modeled based on a throttle position when the throttle position is outside the threshold distance of wide open throttle, and wherein the sensed manifold pressure change is based on output from a manifold pressure sensor. The controller may further, in response to the commanded induction ratio being within a threshold distance of 1.0, independent of the operator torque demand and the throttle position, constrain the commanded induction ratio to 1.0. Indicating degradation may include indicating degradation responsive to a difference between the commanded induction ratio and the estimated actual induction ratio being higher than a threshold. Further, responsive to the indicating, the controller may reactivate the selectively deactivated one or more engine cylinders. Further, in response to throttle opening being within a threshold distance of wide open throttle, independent of the operator torque demand, the controller may increase the commanded induction ratio to a first induction ratio while reducing throttle opening to more than the threshold distance of wide open throttle, the first induction ratio being a next available induction from the commanded induction ratio, the first induction ratio higher than the commanded induction ratio. Further, after increasing the commanded induction ratio to the first induction ratio, adjusting throttle opening based the operator driver torque demand, and responsive to the throttle opening being within the threshold distance of wide open throttle after the adjusting, increasing the first induction ratio to a second induction ratio, the second induction being the next available induction ratio from the first induction ratio, the second induction ratio higher than the first induction ratio.

In this way, by using a model of the throttle body to characterize airflow entering the engine over a wider range of engine operating conditions, the need for a MAF sensor for air flow metering during torque estimation is reduced. This provides component reduction benefits in terms of cost and complexity. By relying on the throttle body model based air flow estimation in conjunction with an indication of pressure change across the throttle (e.g., using an existing MAP sensor), independent data for torque monitoring may be provided. This allows for an actual induction ratio to be estimated accurately and reliably using fewer sensors. The technical effect of coordinating throttle adjustments with induction ratio adjustments as torque demand changes is that throttle position can be maintained at a minimum margin from WOT over a larger portion of a drive cycle, allowing for higher accuracy of air flow metering via the throttle body model over the larger portion of a drive cycle. In particular, by decreasing throttle opening while concurrently step-wise incrementing induction ratio, engine torque output can be increasing without moving the throttle to a WOT position. By comparing the estimated actual induction ratio to the desired induction ratio (based on torque demand), degradation of a VDE mechanism may be learned. The technical effect of constraining the commanded induction ratio during conditions when air flow metering can be inaccurate, such as when the throttle is within a threshold of wide-open-throttle, deficiencies in using the throttle body model may be overcome, and the likelihood of over delivering torque may be reduced. As a result, drivability of a vehicle having a variable displacement engine is improved.

One example method comprises: operating a variable displacement engine with an induction ratio based on operator torque demand; and responsive to throttle position being within a threshold distance of wide open throttle, independent of the operator torque demand, increasing the induction ratio. In the preceding example, additionally or optionally, operating with an induction ratio based on operator torque demand includes operating with a higher induction ratio when the operator torque demand is higher and operating with a lower induction ratio when the operator torque demand is lower, the higher induction ratio provided by selectively deactivating fewer engine cylinders, the lower induction ratio provided by selectively deactivating more engine cylinders. In any or all of the preceding examples, additionally or optionally, increasing the induction ratio includes incrementally increasing a number of active cylinders firing over each engine cycle. In any or all of the preceding examples, additionally or optionally, increasing the induction ratio includes constraining the induction ratio to or towards 1.0. In any or all of the preceding examples, additionally or optionally, the induction ratio is a commanded induction ratio, the method further comprising, estimating an actual induction ratio based on a modeled mass air flow through the throttle relative to a sensed manifold pressure rate of change across the throttle, comparing the commanded induction ratio to the estimated actual induction ratio, and indicating degradation of a variable displacement engine mechanism based on the comparing. In any or all of the preceding examples, additionally or optionally, the indicating is responsive to a difference between the commanded induction ratio and the estimated actual induction ratio being higher than a threshold difference, the method further comprising, responsive to the indication, disabling selective cylinder deactivation independent of the operator torque demand. In any or all of the preceding examples, additionally or optionally, the modeled mass air flow is modeled based on a throttle position when the throttle position is outside the threshold distance of wide open throttle. In any or all of the preceding examples, additionally or optionally, the modeled mass air flow is not based on the output of a mass air flow sensor. In any or all of the preceding examples, additionally or optionally, estimating the actual induction ratio includes estimating an actual engine torque based on the modeled mass air flow through the throttle relative to a sensed manifold pressure rate of change across the throttle; and estimating the actual induction ratio based on the actual engine torque. In any or all of the preceding examples, additionally or optionally, the method further comprises, responsive to the commanded induction ratio being within a threshold of 1.0, independent of the operator torque demand and a position of the throttle, increasing the induction ratio. In a further representation, increasing the induction ratio includes incrementally increasing a number of active cylinders by incrementally reactivating selectively deactivated cylinders.

Another example method comprises: selectively deactivating one or more engine cylinders to operate an engine at a commanded induction ratio based on operator torque demand; estimating an actual induction ratio based on modeled mass air flow through an intake throttle relative to a sensed manifold pressure change across the throttle; and indicating degradation of a selectively cylinder deactivation mechanism based on the commanded induction ratio relative to the estimated actual induction ratio. In the preceding example, additionally or optionally, the method further comprises, in response to throttle opening being within a threshold distance of wide open throttle, independent of the operator torque demand, increasing the commanded induction ratio to a first induction ratio while reducing throttle opening to more than the threshold distance of wide open throttle, the first induction ratio being a next available induction from the commanded induction ratio, the first induction ratio higher than the commanded induction ratio. In any or all of the preceding examples, additionally or optionally, the method further comprises, after increasing the commanded induction ratio to the first induction ratio, adjusting throttle opening based the operator driver torque demand, and responsive to the throttle opening being within the threshold distance of wide open throttle after the adjusting, increasing the first induction ratio to a second induction ratio, the second induction being the next available induction ratio from the first induction ratio, the second induction ratio higher than the first induction ratio. In any or all of the preceding examples, additionally or optionally, the modeled mass air flow is modeled based on a throttle position when the throttle position is outside the threshold distance of wide open throttle, and wherein the sensed manifold pressure change is based on output from a manifold pressure sensor. In any or all of the preceding examples, additionally or optionally, the method further comprises, in response to the commanded induction ratio being within a threshold distance of 1.0, independent of the operator torque demand and the throttle position, constraining the commanded induction ratio to 1.0. In any or all of the preceding examples, additionally or optionally, the indicating includes indicating degradation responsive to a difference between the commanded induction ratio and the estimated actual induction ratio being higher than a threshold, the method further comprising, responsive to the indicating, reactivating the selectively deactivated one or more engine cylinders.

Another example engine system comprises: a variable displacement engine; a plurality of cylinders, each having selectively deactivatable valve mechanisms and a selectively deactivatable fuel injector; a manifold pressure sensor; a throttle position sensor; an intake throttle; and a controller with computer-readable instructions stored on non-transitory memory for: selectively deactivating a number of the plurality of cylinders to provide a commanded induction ratio based on operator torque demand; increasing throttle opening as a function of increasing operator torque demand while maintaining the commanded induction ratio until throttle position is at a threshold distance of wide open throttle; and when the throttle position is at the threshold distance of wide open throttle, increasing the commanded induction ratio by selectively reactivating one of the number of deactivated cylinders while decreasing the throttle opening to move the throttle position to higher than the threshold distance of wide open throttle. In any or all of the preceding examples, additionally or optionally, the controller includes further instructions for, responsive to increasing operator torque demand while the throttle position is at the threshold distance of wide open throttle and the commanded induction ratio is increased to 1.0, maintaining all the plurality of cylinders active; and increasing the throttle opening to move the throttle position to wide open throttle. In any or all of the preceding examples, additionally or optionally, the controller includes further instructions for, responsive to each of the throttle position being outside the threshold distance of wide open throttle, estimating an actual induction ratio of the engine based on modeled mass air flow through the throttle relative to sensed manifold pressure change across the throttle; estimating a torque error based on the actual induction ratio relative to the commanded induction ratio; and updating the commanded induction ratio based on the torque error, wherein the modeled mass air flow is not based on the output of a mass air flow sensor. In any or all of the preceding examples, additionally or optionally, the controller includes further instructions for indicating degradation of the selectively deactivatable valve mechanisms or the selectively deactivatable fuel injector responsive to a difference between the commanded induction ratio and the estimated actual induction ratio being higher than a threshold; and responsive to the indicating, reactivating the selectively deactivated one or more of the plurality of cylinders. In a further representation, the engine system is coupled in a hybrid vehicle system.

In a still further representation, a method for an engine having selectively deactivatable cylinders includes, responsive to an increase in operator torque demand, maintaining engine operation with a first induction ratio while increasing a throttle opening, as a function of the increase in torque demand, up until a threshold distance from wide open throttle. In the preceding example, additionally or optionally, the first induction ratio includes a first number of deactivated cylinders and wherein the first induction ratio is based on the operator torque demand. In any or all of the preceding examples, additionally or optionally, after the throttle opening is increased to the threshold distance from wide open throttle, responsive to a further increase in operator torque demand, operating the engine with a second induction ratio higher than the first induction ratio while decreasing throttle opening away from the threshold distance from wide open throttle. In any or all of the preceding examples, additionally or optionally, the second induction ratio has a second number of deactivated cylinders, the second number having one less deactivated cylinder than the first number. In any or all of the preceding examples, additionally or optionally, the decreasing the throttle opening is based on a difference between the first and the second induction ratio, wherein the throttle opening is decreased further as the difference increases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    operating a variable displacement engine with an induction ratio based on operator torque demand;
    responsive to throttle position being within a threshold distance of wide open throttle, independent of the operator torque demand, increasing the induction ratio, wherein the induction ratio is a commanded induction ratio; and
    estimating an actual induction ratio based on a modeled mass air flow through the throttle and a sensed manifold pressure rate of change across the throttle, comparing the commanded induction ratio to the estimated actual induction ratio, and indicating degradation of a variable displacement engine mechanism based on the comparing.

2. The method of claim 1, wherein operating with the induction ratio based on operator torque demand includes operating with a higher induction ratio when the operator torque demand is higher and operating with a lower induction ratio when the operator torque demand is lower, the higher induction ratio provided by selectively deactivating fewer engine cylinders, the lower induction ratio provided by selectively deactivating more engine cylinders.

3. The method of claim 1, wherein increasing the induction ratio includes incrementally increasing a number of active cylinders firing over each engine cycle.

4. The method of claim 1, wherein increasing the induction ratio includes constraining the induction ratio to or towards 1.0.

5. The method of claim 1, wherein the indicating is responsive to a difference between the commanded induction ratio and the estimated actual induction ratio being higher than a threshold difference, the method further comprising, responsive to the indication, disabling selective cylinder deactivation independent of the operator torque demand.

6. The method of claim 1, wherein the modeled mass air flow is modeled based on a throttle position when the throttle position is outside the threshold distance of wide open throttle.

7. The method of claim 6, wherein the modeled mass air flow is not based on output of a mass air flow sensor.

8. The method of claim 1, wherein estimating the actual induction ratio includes:
    estimating an actual engine torque based on the modeled mass air flow through the throttle and the sensed manifold pressure rate of change across the throttle; and
    estimating the actual induction ratio based on the actual engine torque.

9. The method of claim 1, further comprising,
    responsive to the commanded induction ratio being between a threshold and 1.0, independent of the operator torque demand and a position of the throttle, increasing the induction ratio.

10. A method, comprising:
    selectively deactivating one or more engine cylinders to operate an engine at a commanded induction ratio based on operator torque demand;
    estimating an actual induction ratio based on modeled mass air flow through an intake throttle and a sensed manifold pressure change across the throttle; and
    indicating degradation of a selectively deactivatable cylinder deactivation mechanism based on the commanded induction ratio and the estimated actual induction ratio.

11. The method of claim 10, further comprising, in response to throttle opening being within a threshold distance of wide open throttle, independent of the operator torque demand, increasing the commanded induction ratio to a first induction ratio while reducing the throttle opening to more than the threshold distance of wide open throttle, the first induction ratio being a next available induction from the commanded induction ratio, the first induction ratio higher than the commanded induction ratio.

12. The method of claim 11, further comprising, after increasing the commanded induction ratio to the first induction ratio, adjusting the throttle opening based on the operator torque demand, and responsive to the throttle opening being within the threshold distance of wide open throttle after the adjusting, increasing the first induction ratio to a second induction ratio, the second induction being the next available induction ratio from the first induction ratio, the second induction ratio higher than the first induction ratio.

13. The method of claim 11, wherein the modeled mass air flow is modeled based on a throttle position when the throttle position is outside the threshold distance of wide open throttle, and wherein the sensed manifold pressure change is based on output from a manifold pressure sensor.

14. The method of claim 10, further comprising, in response to the commanded induction ratio being between a threshold and 1.0, independent of the operator torque demand and the throttle position, constraining the commanded induction ratio to 1.0.

15. The method of claim 10, wherein the indicating includes indicating degradation responsive to a difference between the commanded induction ratio and the estimated actual induction ratio being higher than a threshold, the method further comprising, responsive to the indicating, reactivating the selectively deactivated one or more engine cylinders.

16. An engine system, comprising:
a variable displacement engine;
a plurality of cylinders, each having selectively deactivatable valve mechanisms and a selectively deactivatable fuel injector;
a manifold pressure sensor;
a throttle position sensor;
an intake throttle; and
a controller with computer-readable instructions stored on non-transitory memory configured to:
selectively deactivate a number of the plurality of cylinders to provide a commanded induction ratio based on operator torque demand;
increase throttle opening as a function of increasing the operator torque demand while maintaining the commanded induction ratio until throttle position is at a threshold distance of wide open throttle; and
when the throttle position is at the threshold distance of wide open throttle, increase the commanded induction ratio by selectively reactivating one of the number of deactivated cylinders while decreasing the throttle opening to move the throttle position to higher than the threshold distance of wide open throttle,
estimate an actual induction ratio based on modeled mass air flow through an intake throttle and a sensed manifold pressure change across the throttle; and
indicate degradation of the selectively deactivatable valve mechanisms based on the commanded induction ratio and the estimated actual induction ratio.

17. The system of claim 16, wherein the controller is further configured to:
responsive to increasing operator torque demand while the throttle position is at the threshold distance of wide open throttle and the commanded induction ratio is increased to 1.0,
maintain all the plurality of cylinders active; and
increase the throttle opening to move the throttle position to wide open throttle.

18. The system of claim 17, wherein the controller is further configured to:
responsive to each of the throttle position being outside the threshold distance of wide open throttle,
estimate the actual induction ratio of the engine based on the modeled mass air flow through the throttle and sensed manifold pressure change across the throttle;
estimate a torque error based on the actual induction ratio and the commanded induction ratio; and
update the commanded induction ratio based on the torque error, wherein the modeled mass air flow is not based on output of a mass air flow sensor.

19. The system of claim 18, wherein the controller is further configured to:
indicate degradation of the selectively deactivatable fuel injector responsive to a difference between the commanded induction ratio and the estimated actual induction ratio being higher than a threshold; and
responsive to the indicating, reactivate the selectively deactivated one or more of the plurality of cylinders.

* * * * *